May 17, 1966  R. S. KNAPP  3,251,148
WATER LEVEL GAUGE FOR STEAM IRONS
Filed Jan. 21, 1965
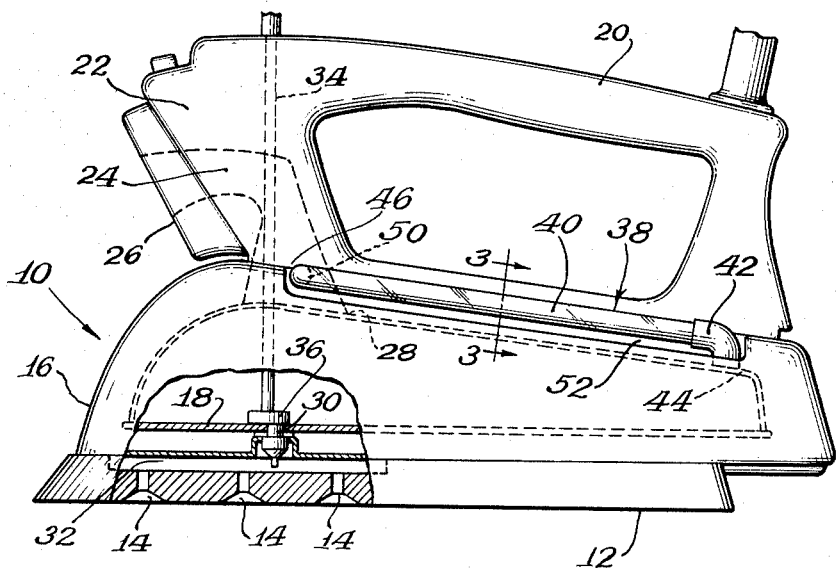
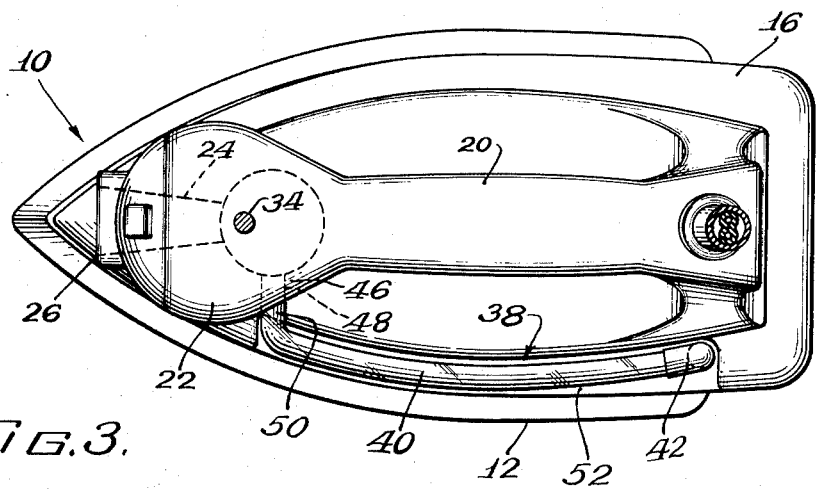
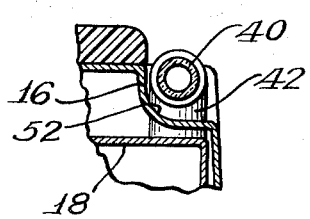
Inventor:
Robert S. Knapp
By Bair, Freeman & Molinare
Attys.

United States Patent Office 3,251,148
Patented May 17, 1966

3,251,148
WATER LEVEL GAUGE FOR STEAM IRONS
Robert S. Knapp, St. Louis, Mo., assignor to Knapp-Monarch, a corporation of Delaware
Filed Jan. 21, 1965, Ser. No. 426,870
6 Claims. (Cl. 38—77)

This invention relates to an improved steam iron and it particularly relates to an improved water level gauge for steam irons which also acts to avoid spurting of water from the water tank through the water inlet.

One of the recent additions in some types of steam irons is the provision of a water level gauge for determining the amount of water in the water storage tank of the iron. Such a concept is not novel, broadly speaking, and such devices generally consist of a transparent tube which is connected at its ends between the front and rear ends of the water tank. The tube extends across the top of the housing of the iron and is located between the front and rear posts of the handle of the iron. These existing constructions have at least two significant disadvantages. One disadvantage is that two connections to the water tank are required; this is undesirable since the number of joints through which water or steam could leak is increased. Another disadvantage of the known constructions is that the useful length of the transparent tube is significantly less than the overall length of the water tank. This results in the said constructions from the location of the tubular gauge between the front and rear support posts of the iron. As an example, in one known construction, the water level gauge has a length, and thereby a usefulness, of only about 60% of the overall length of the water tank. Thus, the water level in the water tank cannot be determined if the quantity of water in the tank is less than a certain amount, say 20%, or is greater than a certain amount, say 80%. Thus, the purpose and advantages of such devices are greatly diminished.

It is therefore an important object of this invention to provide an improved water level gauge for steam irons wherein the disadvantages of prior art constructions are substantially avoided.

It is also an object of this invention to provide an improved water level gauge for steam irons wherein the number of fitting connections between the water tank and the water level sight tube is reduced from two to one, thereby substantially reducing the number of connections which are vulnerable to water or steam leaks.

It is another object of this invention to provide an improved water level gauge for steam irons wherein the effective readable or useful length of the water level sight tube is significantly increased over prior art constructions and may be readily increased to a useful length of about 90% of the overall length of the water storage tank.

A particularly vexing problem which has been encountered in the steam iron manufacturing industry for many years is the problem of water spurting out of the water inlet of the steam iron. This spurting problem is caused by the expansion by heat of air trapped within the water tank at a place above the water level in the tank. The expanding air pocket causes water to spurt or gush out of the filler opening of the steam iron. This problem often occurs when the iron is heated for relatively long periods of time when the water tank is quite full and when the iron is being used as a dry iron and not as a steam iron. It is therefore another important object of this invention to provide an improved steam iron wherein the spurting problem commonly encountered with steam irons is substantially avoided.

It is yet another object of this invention to provide an improved steam iron wherein an improved water level gauge construction surprisingly also functions to substantially eliminate the water spurting problem encountered with steam irons.

Further purposes and objects of this invention will appear as the specification proceeds.

A particular embodiment of the present invention is illustrated in the accompanying drawing wherein:

FIGURE 1 is a side elevational, fragmentary view of a steam iron having my improved water level gauge;

FIGURE 2 is a top plan view of the embodiment of FIGURE 1; and

FIGURE 3 is a sectional view taken along the line 3—3 of FIGURE 1.

Referring to the drawing, the steam iron 10 is provided with a soleplate 12 having openings 14 therein permitting the passage of steam therethrough. A metal housing 16 is secured in a suitable manner to the soleplate 12 and encloses a water storage tank or reservoir 18 and the iron heating means (not shown). The housing 16 is secured in a suitable manner to a handle assembly 20, which includes a hollow front support post 22 having a water inlet or entrance 24 through which water is passed into the water tank 18. The water inlet or entrance opening 24 is of generally right angle configuration having its outer end at the forward end 26 of the support post 22 and having its inner end terminating at the upper, front portion 28 of the water tank 18. A suitable seal is provided between the inlet 24 and the water tank 18 in order to substantially avoid the leaking of water therethrough.

Generation of steam by the iron 10 is accomplished when water passes from the water tank 18 through the water tank outlet 30 and into the steam generation space 32. This is accomplished by actuating a rod member 34 which is reciprocally supported within the hollow support post 22 and includes a valve portion 36 at its lower end. When the valve 36 is raised from the outlet 30, water passes into the generation space 32 and the heated soleplate 12 generates steam which passes outwardly through the steam openings 14 in the soleplate 12.

The improved water level gauge, generally indicated at 38, includes a tubular member 40 which is constructed of any suitable transparent tubing of relatively high heat resistance. The tubular member 40 may be constructed, for example, of high temperature glass, such as orthosilicate glass, or various high temperature plastics, such as a polycarbonate thermal plastic material. One of the important features of my improved water level gauge construction 38 is in the provision of only one elbow type fitting 42 for connecting the lower end of tube 40 to one end, the rear upper portion 44, of the water tank 18. The said connection is in close proximity to the rear of the tank 18 so that the fitting 42 opens in substantial alignment with the rear portion of the tank 18. In this way, the water level gauge 38 is effective for determining the quantity of water in the tank even when the water level is quite low. The fitting 42 is preferably made of a resilient heat resistant material, such as high temperature silicone rubber. A suitable seal is provided between the fitting 42 and the tank 18 in order to substantially prevent water or steam leaks.

A most important feature of the applicant's construction is that the upper, or forward end 46 of the tubular member 40 terminates or opens laterally directly to a region maintained at atmospheric pressure and at a position above the upper inlet opening to water tank 18, when the iron is in the operative position, and at a point adjacent to the forward end of the iron 10. Although the tube 40 may terminate anywhere adjacent the forward upper portion of the iron, it is preferred that it terminate in the upright hollow filling tube or pasageway 24 located in the support post 22. This preferred construction provides protection for the end of the tubular member 40 since snug support is provided therefor by a channel 48 in the post 22, which channel extends from the outer lateral surface to provide communication with hollow inlet 44. The front end portion 50 of the tube 40 comprises a right angle bend snugly received by the channel 48.

Preferably, an elongated recess 52 is provided along a curved, lateral upper edge of the housing 16 for receiving the tubular member 40 therein. The recess protects the tubular sight member 40 from damage.

The termination of the tubular member 40 to the atmosphere at a position which is above the water tank 18 and at the forward end of the steam iron 10 results in important advantages. By eliminating one fitting to the water tank 18, a second vulnerable connection is avoided. Furthermore, the elimination of the second fitting assists in providing a greater effective or usable length of water level sight tube 40 since it may extend a greater distance towards the front end of the water tank 18. Thus, when the iron 10 is in the upright or filling position, the water level gauge 38 is effective for determining the quantity of water in the tank when it is almost full. A still further important advantage accomplished by the termination of the water level gauge 38 to the atmosphere, rather than to the water tank, is the substantial elimination of water spurting problems which have been encountered with all known steam irons. In the described structure, when air pockets are developed and expand within the water tank when it is rather full, the pressure is relieved through the tubular member 40 so that the force of the spurting water is dissipated along the length of the tube.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. In a steam iron having a front end and a water tank contained therein with entrance means open to atmosphere at said front end communicating with said water tank to provide for the introduction and movement of water into said water tank, the improvement comprising a heat resistant tubular member connected to the rear end of said water tank, said tubular member having its other end opening to the said entrance means and to atmosphere at the front end of said iron, so that any discharge of water through said other end of the tubular member is directed into said entrance means.

2. In a steam iron having a front end, a rear end, and a water tank contained therein with entrance means at atmospheric pressure at said front end to provide for the introduction of water into said water tank, the improvement comprising a substantially transparent, heat resistant tubular member positioned above said water tank when said iron is in operative position for determining the water level in said tank when said iron is placed in an upright position, and resilient means for connecting one end of said tubular member to said water tank at the rear end of said iron, said tubular member having its other end opening to the said entrance means and to atmosphere at the front end of said iron.

3. In a steam iron having a front end, a rear end, and a water tank contained therein with entrance means open to atmosphere at said front end to provide for introduction of water into said water tank, the improvement comprising a substantially transparent heat resistant tubular member positioned above said tank when said iron is in operative position for determining the water level in said tank when said iron is placed in an upright position, a resilient, heat resistant member for connecting one end of said tubular member to said water tank at the rear end of said iron, and means connecting the other end of said tubular member to said entrance means, and being open to the atmosphere therein.

4. The device of claim 3 wherein said steam iron includes a housing having an upper portion with an elongated recessed portion for receiving said tubular member.

5. In an elongated steam iron having a water tank contained therein with means defining a water entrance through the top of the water tank adjacent one end of the iron and open to atmosphere; the improvement of a water level gauge that includes an elongated transparent tubular member carried on said iron with one end thereof connected by fitting means to one end of said water tank and arranged to be disposed in an inclined position on said iron when the iron is used for ironing, and the other end of said tubular member being connected to said water entrance and being open to atmospheric pressure.

6. The device of claim 5 wherein said other end of said tubular member is disposed to discharge back into the said tank through the said water entrance.

References Cited by the Examiner

UNITED STATES PATENTS

| 1,830,875 | 11/1931 | Izumiya | 38—77 |
| 2,825,986 | 3/1958 | Paulic | 38—77 |
| 2,970,394 | 2/1961 | Brumbaugh | 38—77 |
| 3,049,922 | 8/1962 | Schwaneke | 73—323 |
| 3,075,309 | 1/1963 | Seyfried et al. | 38—77 |

JORDAN FRANKLIN, *Primary Examiner.*

P. D. LAWSON, *Assistant Examiner.*